(12) United States Patent
Fugel et al.

(10) Patent No.: US 6,648,519 B2
(45) Date of Patent: Nov. 18, 2003

(54) ROLLING BEARING CAGE

(75) Inventors: Wolfgang Fugel, Nuremberg (DE); Alexander Reimchen, Furth (DE); Leo Muntnich, Aurachtal (DE)

(73) Assignee: Ina-Schaeffler KG (DE)

( * ) Notice: Subject to any disclaimer, the term of this patent is extended or adjusted under 35 U.S.C. 154(b) by 2 days.

(21) Appl. No.: 10/157,068

(22) Filed: May 29, 2002

(65) Prior Publication Data
US 2002/0181821 A1 Dec. 5, 2002

(30) Foreign Application Priority Data
May 30, 2001 (DE) .......................... 101 26 217

(51) Int. Cl.$^7$ .............................................. F16C 33/54
(52) U.S. Cl. ...................... 384/580; 384/575
(58) Field of Search ........................... 384/572, 575, 384/580

(56) References Cited
U.S. PATENT DOCUMENTS 3,110,529 A * 11/1963 Schaeffler ............... 384/580
5,584,583 A * 12/1996 Hidano .................. 384/580

FOREIGN PATENT DOCUMENTS

| DE | 965459 | 6/1957 |
|----|--------|--------|
| DE | 2147170 | 3/1973 |
| DE | 19702192 | 7/1998 |
| DE | 19835261 | 2/1999 |
| DE | 19740435 | 3/1999 |

* cited by examiner

Primary Examiner—Thomas R. Hannon
(74) Attorney, Agent, or Firm—Muserlian, Lucas and Mercanti

(57) ABSTRACT

In a cage for cylindrical rolling bearings (5), which cage is rolled out of a sheet metal strip (12), the pockets (4), as seen in a top view, have, in a profiled, punched and unbent state of the sheet metal strip (12), a curved shape in a region of the inclined sections (8, 9), so that an axially inner, first convex curve B1 merges into an outer, second concave curve B2. This pocket contour of the invention makes it possible to obtain a separation between the retention of the rolling elements and the contact region of the rolling elements in the cage solely by the punching of the pockets in combination with a subsequent bending of the cage strip into a finished cage.

9 Claims, 5 Drawing Sheets

ROLLING BEARING CAGE

FIELD OF THE INVENTION

The invention concerns a cage for cylindrical rolling elements, particularly needle rollers, said cage being rolled out of a sheet metal strip and comprising two side rings that are connected by profiled crossbars that form pockets, said crossbars comprising sections that are situated inside of a pitch circle and, parallel to said sections, further sections that are situated outside of the pitch circle, said sections and said further sections being connected to one another by still further sections that are inclined to a cage axis.

BACKGROUND OF THE INVENTION

A cage of the pre-cited type is known from the document DE-OS 21 47 170 and is made by a method in which a flat sheet metal strip is worked into the desired cross-sectional profile by rolling, the pockets for lodging the rolling elements are punched out either before or after the profiling step, and finally, the strip is bent into a circular shape, whereafter, if required, its free ends are welded together. In such thin-walled profiled and bent M- or W-shaped cages, the rolling elements are retained by retaining edges arranged inside or outside the pitch circle. The cages are made of thin-walled sheet metal because its very small wall thickness permits a particularly economic fabrication of the pockets by punching.

This, however, has the drawback that punching tears and generally rough punched surfaces are formed on the crossbars i.e., the guide surfaces for the rolling elements are rough and inexact on the whole. But rough crossbar surfaces on which the needle rollers run lead to abrasion. Inexact crossbar surfaces, in their turn, lead to an axial displacement and an axial contact of the cage end faces against the axial boundary surfaces of the bearing with considerable surface pressure. In the case of idler pulley bearings in mechanical transmissions, this can result in considerable transverse and displacing forces acting on the idler pulley bearing and make the bearings tend to wobbling movements. Another drawback results from punching out the pockets before bending the cage strip into a round shape. In the finished cage, the pockets then have a V-shaped profile in the direction of the bearing center so that there is the danger of the rolling elements getting clamped.

Starting from this prior art, an attempt has been made in DE 197 40 435 A1 to avoid the aforesaid drawback viz., that the cage pockets for lodging the needle rollers have a V-shaped configuration in the finished, bent state of the cage. The procedure used is that, after the pockets have been punched out, an additional shaping step, known to the person skilled in the art under the name of stamping, is carried out in which, by a displacement of material, the cage pockets are pressed into the shape required for its precise functioning. This means, in the first place, that the rolling elements bear against the cage crossbars in the region of the pitch circle and not, as was hitherto the case, inside or outside the pitch circle. By virtue of this guidance in the region of the pitch circle, that is obtained through parallel guiding surfaces of the pockets, the undesired transverse and displacing forces on the cage are avoided.

A drawback of this is that the improved function of the cage is obtained only at the price of carrying out an additional work step, the so-called stamping. Stamping is effected in that each individual crossbar of a cage is loaded on both sides with two tong-like stamping tools using a force that produces a material displacement in the crossbar region. It is quite obvious that such a fabrication technology is very complex and expensive due to the separate working of each individual crossbar.

OBJECTS OF THE INVENTION

It is an object of the invention to improve a generic cage of the pre-cited type so that its excellent running properties i.e., the rolling contact of the rolling elements in the region of the pitch circle, can be obtained during the fabrication process even without an additional work step.

This and other objects and advantages of the invention will become obvious from the following detailed description.

SUMMARY OF THE INVENTION

The invention achieves the above objects by the fact that in the profiled, punched and unbent state of the sheet metal strip, the pockets, as seen in a top view, have a curved shape in the region of the inclined sections, so that an axially inner, first convex curve B1 merges into an outer, second concave curve B2.

Due to the adapted pocket geometry of the invention i.e., the special configuration of the crossbars in the profile transition between sections situated inside and outside the pitch circle, it is achieved that in the finished, bent state, the pocket flank in the profile transition is radially parallel to the center of the pocket and axially parallel to the rolling element. This means that the rolling elements run against the individual crossbars of the cage within the pitch circle region. Because, as taught by the invention, this pocket geometry is obtained solely by punching i.e., without the stamping step hitherto required in the prior art, a cage of this type can be made much faster and at substantially lower cost. The separation, known per se, between the outer and inner retention of the rolling elements on the one hand, and the contact region of the rolling elements on the cage, on the other hand, is obtained for the first time simply and solely by the pocket geometry produced by punching, in combination with bending round the cage strip to form the finished cage. This means that the pocket geometry in the flat strip must be configured so that, after the strip is bent round, the rolling elements contact the cage in the region of the pitch circle.

Advantageous features of the invention will be described below.

According to a first advantageous feature, the cage has an M-shaped configuration which means that the sections of the cage starting from the side rings and extending parallel to the cage axis are arranged outside the pitch circle. If according to another feature, the cage has a W-shaped configuration, the sections of the cage starting from the side rings and extending parallel to the cage axis are arranged inside the pitch circle.

According to further features of the invention, the cage can be guided on the outside, on the inside or on the rolling elements. Finally, according to still other features of the invention, the cage can be used in a crank pin or in a planet gear bearing. Due to the high speeds of rotation in these cases of use, large forces act on the cage so that precisely functioning bearing cages are an indispensable requirement.

Advantageously, the starting material for making the cage is an endless strip that after reaching the desired strip thickness, is appropriately profiled for obtaining the desired, later cage shape. After the cage strip has been profiled, the pockets are punched out and the strip is bent into a round cage shape, whereafter, if necessary, the cage ends are welded together. Cutting to length of individual cage strips to correspond to the desired size of the finished cage can be done before or after profiling or even after the pockets have been punched out.

The invention will now be described more closely with reference to the example of embodiment illustrated in the appended drawings.

DETAILED DESCRIPTION OF THE DRAWINGS

Figure 1:
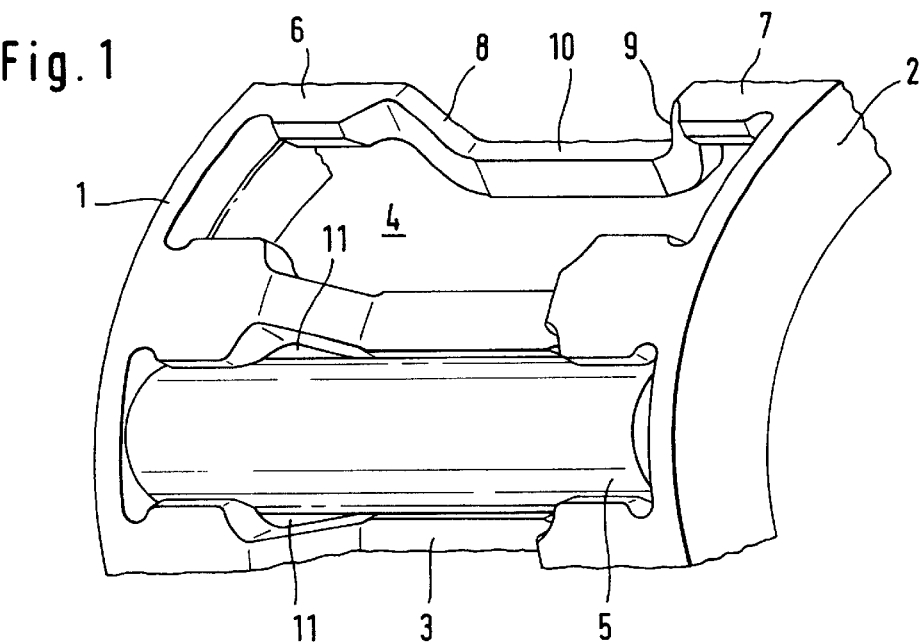
FIG. 1 is a partial perspective representation of a prior art M-shaped cage.
Figure 2:
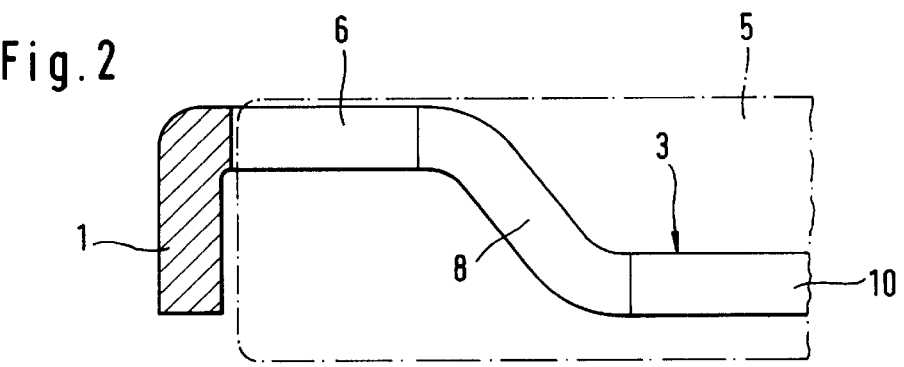
FIG. 2 shows a partial longitudinal section through the cage of FIG. 1.
Figure 3:
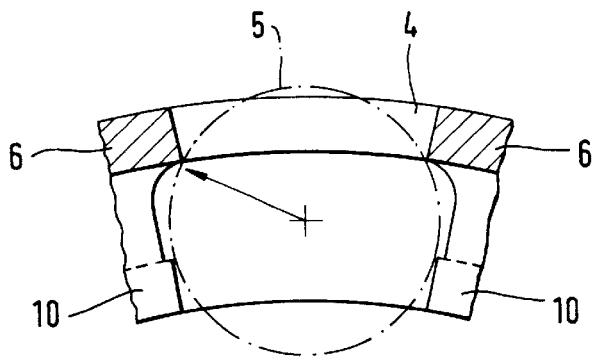
FIG. 3 shows a partial cross-section through the cage of FIG. 1.

The prior art cage represented in FIGS. 1 to 3 comprises the side rings 1 and 2 that are connected to each other by a plurality of circumferentially equally spaced profiled crossbars 3. The pockets 4 thus formed for lodging rolling elements 5 are defined by the side rings 1, 2 and the crossbars 3. The crossbars 3 are bent towards the center of the bearing to beyond the rolling element pitch circle and comprise two sections 6, 7 that start from the side rings 1, 2 to extend parallel to the cage axis. These sections 6, 7 are situated outside the pitch circle and merge respectively into sections 8 and 9 that are inclined to the cage axis and merge with each other to form a section 10 that is parallel to the cage axis while being situated inside the pitch circle. The inner edges of the crossbar sections 10 limit the radial play of the rolling elements in inward direction, while the radial play in outward direction is limited by the outer crossbar sections 6, 7. It can be seen further in FIG. 1 that in the region of the inclined sections 8, 9, i.e., on both sides of the rolling elements 5 in the profiled region of the crossbars, there is a clear space 11 which is required in the prior art to prevent a clamping of the rolling elements.

As can be seen in FIG. 3, due to the bending of the punched cage strip, the pockets 4 have a V-shaped configuration i.e., their clear width decreases in radially inward direction. The rolling element 5 runs with its rolling surface on the inner edges of the crossbar sections 6, 7 so that it is guided outside of the pitch circle, with the initially described drawbacks. These unfavorable running conditions within the bearing are indicated in FIG. 3 by an arrow pointing from the center of the rolling element toward the contact surface.

Figure 4:
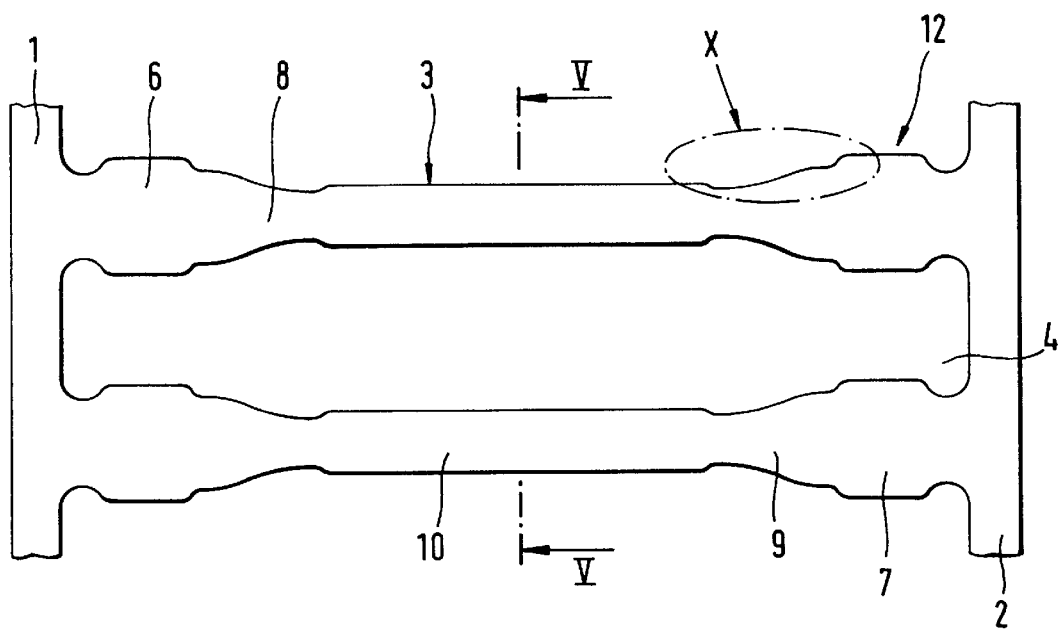
FIG. 4 is a top view of a profiled cage strip of the invention.

FIG. 4 shows a top view of a sheet metal strip 12 of the invention in the unbent state but profiled and provided with punched-out pockets 4. The two edges of the strip that, in the bent state, form the side rings 1, 2 of the cage, merge into sections 6, 7 that extend parallel to the later axis of the cage i.e., in the bent-round state of the cage, they are situated outside of the pitch circle. The side rings 1, 2 and the sections 6, 7 are thus situated in the same plane. The sections 6, 7 continue into the two inclined sections 8, 9 which then merge with each other to form the section 10. In the bent state, the sections 8, 9 extend at an inclination to the cage axis, while the section 10 is parallel to the cage axis and is situated inside the pitch circle.

Figure 5:
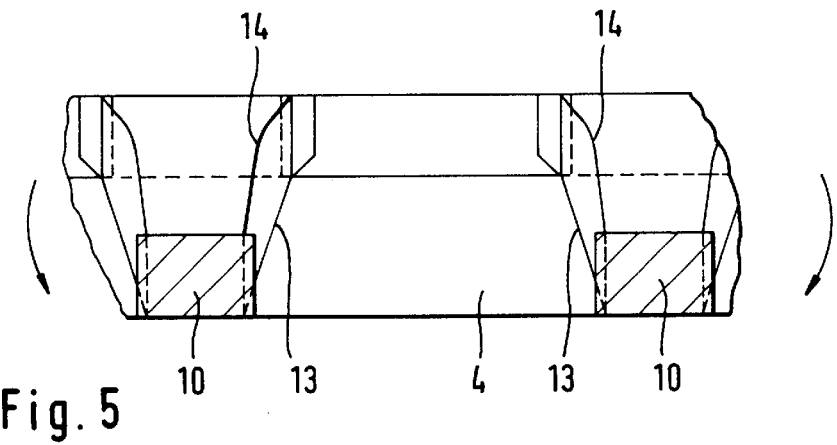
FIG. 5 shows a section taken along line V—V of FIG. 4.
Figure 6:
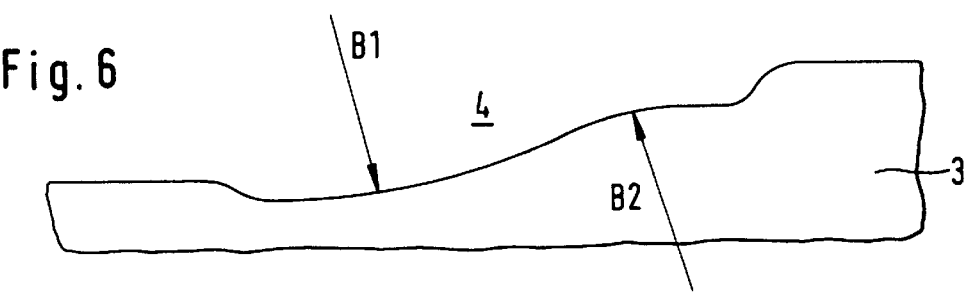
FIG. 6 is an enlarged representation of a detail X from FIG. 4.
Figure 7:
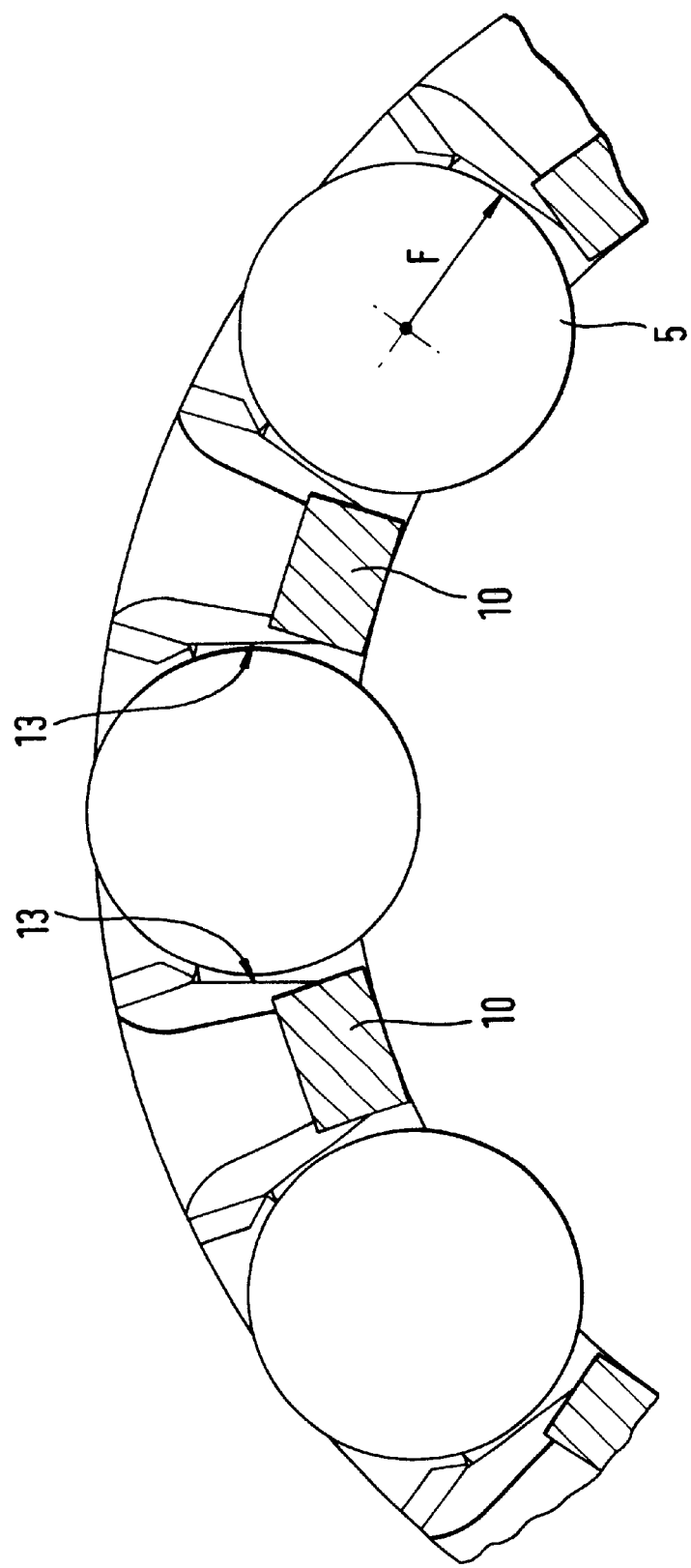
FIG. 7 is a partial cross-section through a cage of the invention.

The subject matter of the invention is the contour of the pockets 4 in the region of the inclined sections 8, 9 i.e., in the profile transition. As can be seen in the enlarged representation of the shape in FIG. 6, the contour of the pockets 4 in the region of the profile transition is S-shaped, so that the axially inner, first convex curve B1 merges into the outer, second concave curve B2. Therefore, as seen in an axial direction from the inside to the outside, the contour of the pockets 4 in the profile transition has a convex/concave shape As shown in FIG. 5, the lower and the upper cut edges 13, 14 are inclined in respect of each other in the profile transition, so that the pocket 4 opens in width in downward direction. By bending in the direction of the arrow, the lower cut edges 13 become almost parallel to each other as can be seen in FIG. 7. The introduction of force, represented in FIG. 7 through the arrow F, that is to say, the contact of the rolling elements 5 with the cage is effected advantageously only in circumferential direction. The important advantage of the invention is, therefore, that the separation between the retention of the rolling elements and the contact region of the rolling elements in the cage is achieved solely by the configuration of the pocket geometry in the profile transition during punching, in combination with bending round the strip to form a cage. In contrast to the prior art, these favorable contact conditions are not realized by stamping the crossbars but simply and solely through the contour of the pockets.

Figure 8:
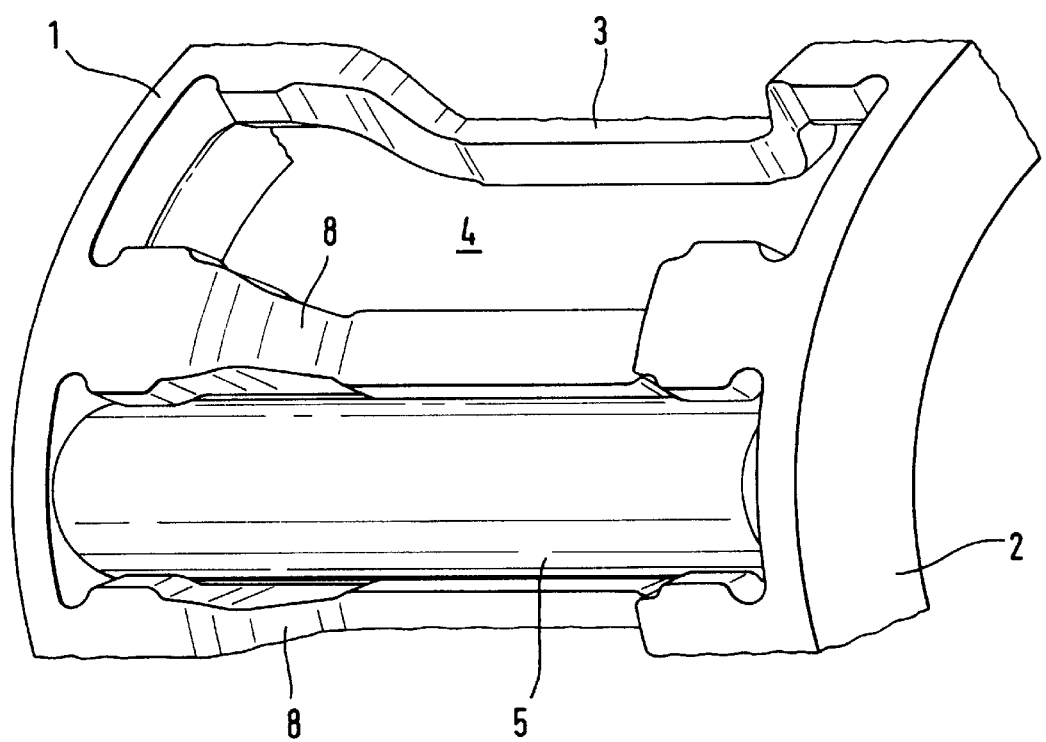
FIG. 8 is a partial perspective representation of a cage of the invention.

As a comparison of FIGS. 1 and 8 shows, the invention permits that, in the profile transition, i.e., in the region of the crossbars with the inclined sections 8, 9, an almost line-shaped contact is obtained between the rolling elements 5 and the crossbars 3 that is realized through the contour of the pocket 4 and by bending round the strip 12 to form the finished cage. Due to this, the clear spaces 11 visible in FIG. 1 on both sides of the rolling element 5 in the profile transition are dispensed with.

Figure 9:
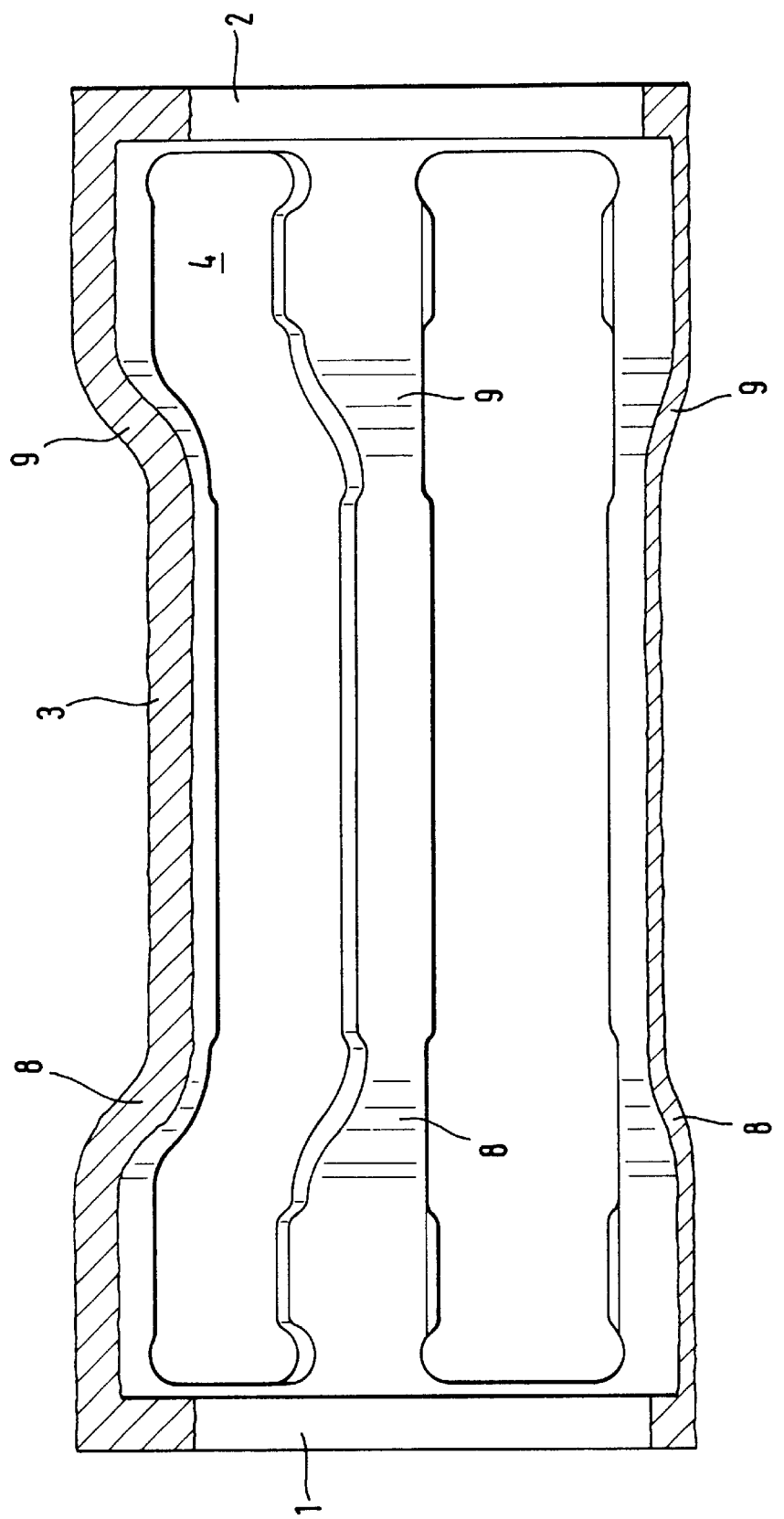
FIG. 9 is a partial perspective representation of the cage of the invention as seen from the inside.

Finally, FIG. 9 shows a partially inner view of a cage of the invention. Here, too, it can be seen that in the regions 8 and 9, there is a line contact with the rolling elements 5.

What is claimed is:

1. A cage for cylindrical rolling elements, said cage being rolled out of a sheet metal strip and comprising two side rings that are connected by profiled crossbars that form pockets, said crossbars comprising sections that are situated inside of a pitch circle and, parallel to said sections, further sections that are situated outside of the pitch circle, said sections and said further sections being connected to one another by still further sections that are inclined to a cage axis, wherein, in a profiled, punched and unbent state of the sheet metal strip, the pockets, as seen in a top view, have a curved shape in a region of the inclined sections, so that an axially inner, first convex curve B1 merges into an outer, second concave curve B2.

2. A cage of claim 1, wherein the rolling elements are needle rollers.

3. A cage of claim 1, wherein the cage has an M-shaped configuration so that the sections situated outside the pitch circle start from the side rings and extend parallel to the cage axis.

4. A cage of claim 1, wherein the cage has a W-shaped cross-section so that the sections situated inside the pitch circle start from the side rings and extend parallel to the cage axis.

5. A cage of claim 1 guided on an outside.

6. A cage of claim 1 guided on an inside.

7. A cage of claim 1 guided on the rolling elements.

8. A cage of claim 1 used in a crank pin.

9. A cage of claim 1 used in a planet gear bearing.

* * * * *